Patented Mar. 13, 1945

2,371,136

UNITED STATES PATENT OFFICE 2,371,136

LIGNIN COMPOUNDS AND PROCESS OF MAKING SAME

Carlyle Harmon, Wausau, Wis., assignor to Marathon Corporation, a corporation of Wisconsin No Drawing. Application July 12, 1943,
Serial No. 494,403

23 Claims. (Cl. 260—124)

This invention relates to a method of making lignin sulphonate compounds and the products produced thereby.

An object of the invention is to prepare lignin sulphonate compounds substantially free from calcium and from non-ligneous organic and inorganic impurities, with controlled composition and properties to make them suitable for various uses. The lignin sulphonate compounds made in accordance with the present invention are acid-insoluble and alkali-dispersible, that is, dispersible under aqueous alkaline conditions, and are also substantially free of manganese and of inorganic compounds.

In some aspects this invention may be considered as an improvement of Howard Patent 1,848,292, March 8, 1932, as it involves the making of lignin sulphonate products with specified properties. Essentially, the present invention resides in the discovery of a new and useful combination of steps for making (1) sodium lignin sulphonate products of exceptionally high purity and other commercially useful properties, and (2) for converting the sodium lignin sulphonate into other lignin sulphonate products by the supplemental steps of washing with salts of other bases or by conversion to free sulphonic acid. Freedom from calcium and other bases forming insoluble carbonates under alkaline conditions is a characteristic of the sodium lignin sulphonate and of all the other products made in accordance with this invention, unless deliberately made otherwise in their conversion from the sodium salt. Freedom from non-ligneous organic and inorganic impurities, insolubility in acids and dispersibility under aqueous alkaline conditions are further characteristics of the sodium and all other products made by the present invention.

In carrying out my process, paper mill waste sulphite liquor is used as the starting material. I prefer to precipitate the lignin substances in the liquor with caustic lime to form basic calcium lignin sulphonate compounds which are prepared in accordance with the procedure disclosed in Howard Reissue Patent No. 18,268, December 1, 1931. These lignin compounds are then dissolved in an aqueous solution of alkali, such as a solution of sodium hydroxide containing an amount of sodium hydroxide equivalent to about one-half the weight of the lignin. An alternate procedure is to concentrate the waste sulphite liquor by evaporation and then to add sodium hydroxide to the concentrated liquor. More caustic, however, is required in this procedure than in the preferred method. The resulting alkaline solution is then heated for a controlled period at a temperature above 100° C. and above atmospheric pressure, say (Example I) at 175° C. for about 0.5 hour, or (Example II) at 160° C. for about 1.5 hours. This hydrolysis renders about 35% to 50% by weight of the lignin compounds insoluble in sulphuric acid solution at about 3.5 pH, but the lignin compounds are still dispersible in aqueous alkaline solution.

The solution resulting from the treatment described may be extracted optionally at this stage with suitable non-aqueous solvents to remove sodium phenolates and other phenolic-like constituents, but this step is not essential for the purposes of this invention. The solid content of the resulting solution containing the hydrolyzed lignin product is then adjusted to between 20 and 28% by weight total solids and carbon dioxide gas is passed into this solution to form sodium carbonate and calcium carbonate. This carbonating reaction is an important feature of the invention and must be carried out under carefully controlled pH conditions in order to obtain crystals of calcium carbonate in the form which can be filtered out. I have found that if the pH of the liquor is lowered to about 10.8 as determined by the glass electrode, all the calcium is precipitated as filterable carbonate, and practically no organic matter is precipitated. If the pH is allowed to drop below 10.7, however, even locally, some organic matter precipitates and filtering of the crystals of calcium carbonate is rendered impractical. On the other hand, if the pH is above about 11.0, the soluble calcium compounds present are not completely carbonated to the insoluble calcium carbonate.

I have found that filterability of the crystals can be improved by "seeding" the incoming batch before the gassing with carbon dioxide is started. This effect is accomplished by adding about 25% by volume of fully carbonated liquor to the raw liquor. Carbon dioxide from almost any source may be used, such as furnace stack gases, dry ice, gas from fermenting liquors, etc. In practice I have found it most economical to use stack gases as they offer additional advantages because the dilute gas tends to form larger crystals of calcium carbonate and the amount of oxygen remaining in stack gases has a mild oxidizing effect on the sodium sulphite present. This gassing is preferably conducted at a temperature of about 65° C. After gassing is completed the temperature may be raised to about 85° C. to improve the filtering characteristics of the solution.

After the calcium carbonate is precipitated it is filtered out on a plate and frame or other suitable type of filter either by filtering alone or with the assistance of filter aids.

The lime-free liquor is then treated with an inorganic acid at a pH of 4.5 or lower, and preferably between 3 and 4 to precipitate lignin compounds. Above this range the bisulphite in the solution appears to have a solubilizing effect on the precipitated lignin compounds. Sulphuric acid can be used satisfactorily for this purpose. Other acids such as sulphurous, hydrochloric and phosphoric may be used also. Sulphurous acid may be introduced as a gas, sulphuric acid at about 35% concentration by weight, hydrochloric acid at about 12% concentration by weight. The use of sulphuric or hydrochloric acid in my process is advantageous in removing any manganese compounds as an undesirable impurity for some uses and also in offering better control of the floc formation and the particle size in order to make a product which can be washed thoroughly to remove accompanying impurities.

Suitable conditions during precipitation must be maintained within critical limits to obtain lignin compounds which can be filtered readily and washed. If the preferred conditions are maintained so as to have (1) about 25% by weight solids in the lignin solution (2) a temperature of 80 to 90° C. (3) a pH between 3 and 4, preferably 3.5, during precipitation, the precipitated product is easily handled. Otherwise, an unfilterable precipitate or a fused mass results. After precipitation is complete it is advantageous to heat carefully to 95 to 98° C. to coagulate the precipitated product.

After coagulation, the precipitate is cooled and filtered from the mother liquor and is then washed with pure water. Washing is continued until substantially all soluble impurities such as residual sulphuric acid, soluble organic matter or inorganic salts are removed. The final product analyzes as lignin sulphonate with a cation equivalent to each monovalent sulphonic group present. This cation will be principally sodium in the process as described, but other cations, including hydrogen and other metals, may optionally be present or predominate in the final product as a result of base exchange treatments. The resulting product is a dark brown to black solid with moderate solubility in warm water, but it fuses at higher temperatures. The solubility is decreased by the presence of salts or acids and increased by the presence of alkali. The product is insoluble in most organic solvents.

The specific hydrolysis treatment given in Examples I and II previously described are to be considered as illustrative embodiments of the present invention and not limiting as to operative conditions. The hydrolysis conditions may obviously be varied considerably depending upon the specific properties desired in the final product. As a result of this treatment, a number of changes take place in the composition and properties of the lignin compounds, including a material reduction in the organically combined sulphur content, for example, about 50% by weight of that originally present in the calcium lignin sulphonate compounds used as a starting material. The resulting lignin product is not a single homogeneous lignin sulphonate compound, but consists of compounds having high and low sulphur content within the limits determined by the specific conditions of the treatment.

The alkaline heat treatment of the process alters the lignin sulphonic acid compounds by reducing the content of organically combined sulphur and altering the compounds in other ways, such as in the nature of polymerization, condensating, rearrangement or cleavage reactions. These alterations are a function of the temperature, pressure, time and other conditions during the heat treatment and hence are controllable to some extent within the permissible limits of yielding lignin sulphonate compounds that are acid-insoluble and dispersible under aqueous alkaline conditions. The reduction in content of organically combined sulphur, i. e. desulphonation, is shown by the following changes in the sulphonic sulphur content that may take place during the process, viz, from 8.2% in the original waste sulphite liquor and 7.0% in the basic calcium lignin sulphonate, through 3.5% in the hydrolyzed alkaline solution for Example I or 4.2% for Example II, to 2.6% for the acid insoluble precipitate from Example I or 3.4% from Example II. The organically combined sulphur content of the final product of the examples is thus reduced to about ½ to about ⅓ by weight of that originally present in the starting material. It is to be understood the examples given are illustrative for given conditions of heat treatment and do not define or limit the permissible desulphonation during the process. The other alterations in the lignin sulphonate compounds by the heat treatment are such that it is not practical to define them analytically but these alterations contribute to the properties of the final products of the process.

For certain purposes it is desirable to prepare the lignin sulphonate product in its free sulphonic acid form. These acid compounds can be obtained by treating the water-washed precipitate first with dilute inorganic acid and then with pure water. These free acid compounds are somewhat more soluble in water, and are more desirable than the sodium salts described for reaction with certain resins or with metallic oxides. During this operation the base exchange properties of the compounds come into play, the hydrogen replacing sodium attached to the sulphonic group. Similarly metallic cations, such as barium, lead, iron, etc. may be exchanged for sodium or hydrogen. For example, in preparing barium lignin sulphonate compounds the filtered precipitate of sodium lignin sulphonate compounds, made as previously described, is washed with water until the soluble impurities are removed, the product is then treated with a soluble barium salt, such as barium chloride, and then with water.

The lignin sulphonate compounds as produced by my method have characteristic and unique properties which make them suitable for use as a plastic either alone or in connection with phenol-formaldehyde or other types of synthetic resins, as a dispersing agent in aqueous alkaline solutions, as an acid insoluble base exchange medium, as an ingredient in the paste for lead storage battery plates and as a starting substance for the preparation of other lignin compounds such as esters or ethers.

Having fully disclosed the essential features of my invention, what I desire to secure by Letters Patent is defined in the following claims:

I claim:

1. The process of producing lignin sulphonate compounds substantially free from non-ligneous organic impurities and being acid-insoluble and alkali-dispersible which comprises treating calcium lignin sulphonate compounds with an aqueous solution of alkali, heating the solution at a temperature above 100° C. and above atmospheric pressure to hydrolyze the lignin compounds and reduce the organically combined sulphur content, treating the resulting solution at a controlled pH range from 10.7 to 11.0 and concentration with carbon dioxide gas to precipitate calcium carbonate in filterable form, filtering out the calcium carbonate, adding an inorganic acid to the filtrate to precipitate lignin sulphonate compounds, and filtering said compounds.

2. The process of producing lignin sulphonate compounds substantially free from calcium and from non-ligneous organic and inorganic impurities and being acid-insoluble and alkali-dispersible which comprises treating waste sulphite liquor with calcium hydroxide to precipitate basic calcium lignin sulphonate compounds, dissolving the calcium lignin sulphonate compounds in an aqueous solution of alkali, heating the solution above 100° C. and above atmospheric pressure to hydrolyze the lignin compounds, and reduce the organically combined sulphur content, treating the resulting solution at a controlled pH range from 10.7 to 11.0 and concentration with carbon dioxide gas to precipitate calcium carbonate, filtering out the calcium carbonate, adding an inorganic acid to the filtrate to lower the pH to between 3 and 4 to precipitate lignin sulphonate compounds, filtering and washing the product with water until substantially all soluble impurities are removed.

3. The process of producing lignin sulphonate compounds substantially free from calcium and from non-ligneous organic and inorganic impurities and being acid-insoluble and alkali-dispersible which comprises treating waste sulphite liquor with calcium hydroxide to precipitate basic calcium lignin sulphonate compounds, dissolving the precipitated calcium lignin sulphonate compounds in an aqueous solution of sodium hydroxide, heating the solution above 100° C. and above atmospheric pressure to hydrolyze the lignin compounds and reduce the organically combined sulphur content, treating the resulting solution at a controlled pH range from 10.7 to 11.0 and concentration with carbon dioxide gas to precipitate calcium carbonate, filtering out the calcium carbonate and treating the filtrate with an inorganic acid to precipitate lignin sulphonate compounds, filtering and then washing the product.

4. The process of producing lignin sulphonate compounds substantially free from calcium and from non-ligneous organic and inorganic impurities and being acid-insoluble and alkali-dispersible which comprises adding to the calcium lignin sulphonate present in waste sulphite liquor an aqueous solution of sodium hydroxide, heating the resultant solution above 100° C. and above atmospheric pressure to hydrolyze the lignin compounds and reduce the organically combined sulphur content, treating the resulting solution at a controlled pH range from 10.7 to 11.0 and concentration with carbon dioxide gas to precipitate calcium carbonate, filtering out the calcium carbonate and treating the filtrate with an inorganic acid to precipitate lignin sulphonate compounds, filtering and then washing the product.

5. The process of producing lignin sulphonic compounds substantially free from calcium and from non-ligneous organic and inorganic impurities and being acid-insoluble and alkali-dispersible which comprises treating waste sulphite liquor with calcium hydroxide to precipitate basic calcium lignin sulphonate compounds, dissolving the basic calcium lignin sulphonate compounds in an aqueous solution of sodium hydroxide, the amount of sodium hydroxide used being equivalent to about one-half the weight of the lignin, heating the solution above 100° C. and above atmospheric pressure to hydrolyze the lignin compounds and reduce the organically combined sulphur content to about ½ to about ⅓ by weight of the original content, treating the resulting solution with carbon dioxide gas while the pH is within a range between 10.7 and 11.0 to precipitate calcium carbonate in filterable form, filtering out the calcium carbonate, adding an inorganic acid to filtrate to reduce the pH to between 3 and 4 to precipitate lignin sulphonate compounds, coagulating the resultant product by heating, filtering and washing the product with water until substantially all soluble impurities are removed.

6. The process of producing lignin sulphonate compounds substantially free from calcium and from non-ligneous organic and inorganic impurities and being acid-insoluble and alkali-dispersible which comprises treating waste sulphite liquor with calicum hydroxide to precipitate basic calcium lignin sulphonate compounds, dissolving the basic calicum lignin sulphonate compounds in an aqueous solution of sodium hydroxide, the amount of sodium hydroxide used being equivalent to about one-half the weight of the lignin, heating the solution from about 160° C. to 175° C. for about ½ to 1½ hours and above atmospheric pressure to hydrolyze the lignin compounds and reduce the organically combined sulphur content to about ½ to about ⅓ by weight of the original content, adjusting the solid content of the resulting solution to about 20 to 28% total solids, treating the resulting solution at a temperature of about 65° C. with carbon dioxide gas while the pH is within a range between 10.7 and 11.0 to precipitate calcium carbonate in filterable form, filtering out the calcium carbonate, adding sulphuric acid to reduce the pH to between 3 and 4 while maintaining the temperature at about 80 to 90° C., to precipitate lignin sulphonate compounds, heating to about 95 to 98° C. to coagulate the resultant product, filtering and washing the product with water until substantially all soluble impurities are removed.

7. The process of producing lignin sulphonate compounds substantially free from calcium and from non-ligneous organic and inorganic impurities and being acid-insoluble and alkali-dispersible which comprises treating waste sulphite liquor with calcium hydroxide to precipitate basic calcium lignin sulphonate compounds, dissolving the basic calcium lignin sulphonate compounds in an aqueous solution of sodium hydroxide, the amount of sodium hydroxide used being equivalent to about one-half the weight of the lignin, heating the solution from about 160° C. to 175° C. for about ½ to 1½ hours and above atmospheric pressure to hydrolyze the lignin compounds and reduce the organically combined sulphur content to about ½ to about ⅓ by weight of the original content, adjusting the solid content of the resulting solution to about 20 to 28% total solids, treating the resulting solution at a temperature of about 65° C. with furnace stack gases while the pH is within a range between 10.7 and 11.0 to precipitate calcium carbonate in filterable form, filtering out the calcium carbonate, adding sulphuric acid to the filtrate to reduce the pH to about 3.5 while maintaining the temperature at about 80 to 90° C., to precipitate lignin sulphonate compounds, heating to about 95 to 98° C. to coagulate the resultant product, filtering and washing the product with water until substantially all soluble impurities are removed.

8. The process of producing lignin sulphonate compounds substantially free from calcium and from non-ligneous organic and inorganic impurities and being acid-insoluble and alkali-dispersible which comprises dissolving the calcium lignin sulphonate derived from waste sulphite liquor in an aqueous solution of alkali, subjecting the solution to heat and pressure to hydrolyze the lignin compounds and reduce the organically combined sulphur content, treating the resulting solution with carbon dioxide gas while the pH is within a range between 10.7 and 11.0 to precipitate calcium carbonate, filtering out the calcium carbonate and treating the filtrate with an inorganic acid to lower the pH to between 3 and 4 to precipitate lignin sulphonate compounds, filtering and then washing the product.

9. The process of producing lignin sulphonate compounds substantially free from calcium and from non-ligneous organic and inorganic impurities and being acid-insoluble and alkali-dispersible which comprises treating waste sulphite liquor with calcium hydroxide to precipitate basic lignin sulphonate compounds, dissolving the basic calcium lignin sulphonate compounds in an aqueous solution of sodium hydroxide, the amount of sodium hydroxide used being equivalent to about one-half the amount of lignin, subjecting the solution to heat and pressure to hydrolyze the lignin compounds and reduce the organically combined sulphur content to about ½ to about ⅓ by weight of the original content, treating the resulting solution with carbon dioxide gas while the pH range is within a range between 10.7 and 11.0 to precipitate calcium carbonate in filterable form, filtering out the calcium carbonate and treating the filtrate with an inorganic acid to precipitate lignin sulphonate compounds, filtering and then washing the product.

10. The process of producing sodium lignin sulphonate compounds substantially free from calcium and from non-ligneous organic and inorganic impurities and being acid-insoluble and alkali-dispersible which comprises treating waste sulphite liquor with calcium hydroxide to precipitate basic calcium lignin sulphonate compounds, dissolving the basic calcium lignin sulphonate compounds in an aqueous solution of sodium hydroxide, subjecting the solution to heat and pressure to hydrolyze the lignin compounds and reduce the organically combined sulphur content to about ½ to about ⅓ by weight of the original content, treating the resulting solution with carbon dioxide gas while the pH is within a range between 10.7 and 11.0 to precipitate calcium carbonate in filterable form, filtering out the calcium carbonate and treating the filtrate with a sulphuric acid solution to precipitate sodium lignin sulphonate compounds, filtering and then washing the product.

11. The process of producing sodium lignin sulphonate compounds substantially free from calcium and from non-ligneous organic and inorganic impurities and being acid-insoluble and alkali-dispersible which comprises treating waste sulphite liquor with calcium hydroxide to precipitate basic calcium lignin sulphonate compounds, dissolving the basic calcium lignin sulphonate compounds in an aqueous solution of sodium hydroxide, subjecting the solution to heat and pressure to hydrolyze the lignin compounds and reduce the original organically combined sulphur content, treating the resulting solution with carbon dioxide gas while the pH is within a range between 10.7 and 11.0 to precipitate calcium carbonate in filterable form, filtering out the calcium carbonate, adding an inorganic acid to lower the pH of the filtrate to about 3.5, maintaining the temperature at about 80 to 90° C. to precipitate sodium lignin sulphonate compounds, filtering and then washing the product.

12. The process of producing lignin sulphonate compounds substantially free from calcium and from non-ligneous organic and inorganic impurities and being acid-insoluble and alkali-dispersible which comprises treating waste sulphite liquor with calcium hydroxide to precipitate basic calcium lignin sulphonate compounds, dissolving the basic calcium lignin sulphonate compounds in an aqueous alkaline solution, subjecting the solution to heat and pressure to hydrolyze the lignin compounds and reduce the original organically combined sulphur content, treating the resulting solution with furnace stack gases while the pH is within a range between 10.7 and 11.0 to precipitate calcium carbonate in filterable form, filtering out the calcium carbonate, adding an inorganic acid to reduce the pH of the filtrate between 3 and 4, maintaining the temperature at about 80 to 90° C. to precipitate lignin sulphonate compounds, filtering and then washing the product.

13. The process of producing free lignin sulphonic acid compounds substantially free from calcium and from non-ligneous organic and inorganic impurities and being acid-insoluble and alkali-dispersible which comprises treating waste sulphite liquor with calcium hydroxide to precipitate basic calcium lignin sulphonate compounds, dissolving the basic calcium lignin sulphonate in an aqueous solution of sodium hydroxide, the amount of sodium hydroxide used being equivalent to about one-half the weight of the lignin, subjecting the solution to heat and pressure at about 160° to 175° C. for about ½ to 1½ hours to hydrolyze the lignin compounds and reduce the organically combined sulphur content to about ½ to about ⅓ by weight of the original content, adjusting the solid content of the resulting solution to 20 to 28% by weight, treating the solution at a temperature of about 65° C. with carbon dioxide gas while the pH is within a range between 10.7 and 10.95 to precipitate calcium carbonate in filterable form, filtering out the calcium carbonate, adding sulphuric acid to the filtrate to reduce the pH between 3 and 4 while maintaining the temperature at about 80 to 90° C. to coagulate the resultant product, cooling and filtering the product, washing the product with water until substantially all soluble impurities are removed, treating the product with dilute sulphuric acid to form free lignin sulphonic acid compounds, filtering and then washing the final product with water.

14. The process of producing lignin sulphonate compounds substantially free from calcium and from non-ligneous organic and inorganic impurities and being acid-insoluble and alkali-dispersible which comprises treating waste sulphite liquor with calcium hydroxide to precipitate basic calcium lignin sulphonate, dissolving the basic calcium lignin sulphonate in an aqueous solution of sodium hydroxide, the amount of sodium hydroxide used being equivalent to about one-half the weight of the lignin, heating the solution above 100° C. and above atmospheric pressure to hydrolyze the lignin compounds and reduce the organically combined sulphur content to about ½ to about ⅓ by weight of the original content, adjusting the solid content of the resulting solution to about 25% total solids, treating the resulting solution with carbon dioxide gas while the pH is within a range between 10.7 and 11.0 to precipitate calcium carbonate in filterable form, filtering out the calcium carbonate, adding an inorganic acid to the filtrate to reduce the pH to about 3.5 while maintaining the temperature at about 80 to 90° C. to precipitate lignin sulphonate compounds, coagulating the resultant product, filtering the product and washing the product with water until substantially all soluble impurities are removed.

15. The process of producing metallic lignin sulphonate compounds substantially free from non-ligneous organic and inorganic impurities and being acid-insoluble and alkali-dispersible which comprises treating calcium lignin sulphonate derived from waste sulphite liquor with an aqueous solution of alkali, heating the solution at a temperature above 100° C. and above atmospheric pressure to hydrolyze the lignin compounds and reduce the organically combined sulphur content, treating the resulting solution at a controlled pH range from 10.7 to 11.0 and concentration with carbon dioxide gas to precipitate all the calcium present as calcium carbonate in filterable form filtering out the calcium carbonate, adding an inorganic acid to the filtrate to precipitate alkali metal lignin sulphonate compounds, filtering and washing the resultant compounds with water until the soluble impurities are substantially removed, and treating with a solution of a metallic salt to form by base exchange reaction metallic lignin sulphonate compounds.

16. The process of producing barium lignin sulphonate compounds substantially free from calcium and from non-ligneous organic and inorganic impurities and being acid-insoluble and alkali-dispersible which comprises treating calcium lignin sulphonate compounds derived from waste sulphite liquor with an aqueous solution of alkali, heating the solution at a temperature above 100° C. and above atmospheric pressure to hydrolyze the lignin compounds and reduce the organically combined sulphur content, treating the resulting solution at a controlled pH range from 10.7 to 11.0 and concentration with carbon dioxide gas to precipitate all the calcium present as calcium carbonate in filterable form, filtering out the calcium carbonate, adding an inorganic acid to the filtrate to precipitate alkali metal lignin sulphonate compounds, filtering and washing the resultant compound with water until the soluble impurities are substantially removed, and treating with a solution of a soluble barium salt to form barium lignin sulphonate compounds.

17. Lignin sulphonate compounds produced by the process of claim 1 having the characteristics of being substantially free from non-ligneous organic matter and being acid-insoluble and dispersible in alkaline solutions.

18. Lignin sulphonate compounds produced by the process of claim 5 having the characteristics of being substantially free from non-ligneous organic matter and being acid-insoluble and dispersible in alkaline solutions.

19. Lignin sulphonate compounds produced by the process of claim 7 having the characteristics of being acid-insoluble and dispersible in alkaline solutions, and substantially free from calcium and manganese compounds and from non-ligneous organic and inorganic impurities.

20. Sodium lignin sulphonate compounds produced by the process of claim 11 having the characteristics of being substantially free from non-ligneous organic matter, acid-insoluble and dispersible in alkaline solutions, and substantially free from calcium and manganese compounds.

21. Free lignin sulphonic acid compounds produced by the process of claim 13 having the characteristics of being substantially free from non-ligneous organic matter, acid-insoluble and dispersible in alkaline solutions, and substantially free from calcium and manganese compounds.

22. Heavy metal lignin sulphonate compounds produced by the process of claim 15 having the characteristics of being substantially free from non-ligneous organic matter and being acid-insoluble and dispersible in alkaline solutions.

23. Barium lignin sulphonate compounds produced by the process of claim 16 having the characteristics of being substantially free from non-ligneous organic matter and being acid-insoluble and dispersible in alkaline solutions.

CARLYLE HARMON.